(12) United States Patent  (10) Patent No.: US 9,321,218 B2
Han  (45) Date of Patent: Apr. 26, 2016

(54) FIBER PRODUCTS, PREPREGS, COMPOSITES AND METHOD OF PRODUCING SAME

(76) Inventor: Nanlin Han, Valencia, CA (US)

( * ) Notice: Subject to any disclaimer, the term of this patent is extended or adjusted under 35 U.S.C. 154(b) by 0 days.

(21) Appl. No.: 11/925,752

(22) Filed: Oct. 27, 2007

(65) Prior Publication Data

US 2008/0193709 A1   Aug. 14, 2008

Related U.S. Application Data

(60) Provisional application No. 60/854,632, filed on Oct. 27, 2006.

(51) Int. Cl.
  *B32B 5/12*  (2006.01)
  *B32B 3/24*  (2006.01)
  *B32B 3/22*  (2006.01)
  *B29C 70/10*  (2006.01)
  *B32B 3/26*  (2006.01)
  *B32B 5/26*  (2006.01)
  *B29L 31/00*  (2006.01)
  *D03D 27/02*  (2006.01)

(52) U.S. Cl.
  CPC . *B29C 70/10* (2013.01); *B32B 3/22* (2013.01); *B32B 3/266* (2013.01); *B32B 5/12* (2013.01); *B32B 5/26* (2013.01); *B29L 2031/727* (2013.01); *B29L 2031/729* (2013.01); *D03D 27/02* (2013.01); *Y10T 428/23914* (2015.04); *Y10T 428/23943* (2015.04); *Y10T 428/24008* (2015.01); *Y10T 428/24017* (2015.01)

(58) Field of Classification Search
  CPC .......... B29C 70/10; B29C 70/06; B32B 3/22; B32B 3/266; B32B 5/15; B32B 5/26; B29L 2031/727; B29L 2031/729; Y10T 428/23914; Y10T 428/23943; Y10T 428/24008; Y10T 428/24017
  USPC ............................ 428/85, 92, 99, 100, 90, 86
  See application file for complete search history.

(56) References Cited

U.S. PATENT DOCUMENTS

| | | | | |
|---|---|---|---|---|
| 1,759,976 A | * | 5/1930 | Cummings | 428/86 |
| 2,717,437 A | | 9/1955 | De Mestral | |
| 3,009,235 A | * | 11/1961 | De Mestral | 428/86 |
| 3,718,725 A | * | 2/1973 | Hamano | 264/163 |

(Continued)

OTHER PUBLICATIONS

L.Tong, A.P. Mouritz and M.K. Bannister, "3D Fibre Reinforced Polymer Composites", Elsevier Science Ltd. 2002.

(Continued)

*Primary Examiner* — Cheryl Juska
(74) *Attorney, Agent, or Firm* — WPAT, P.C., Intellectual Property Attorneys; Anthony King

(57) ABSTRACT

A 3-dimension (3D) multi-layer composite comprises a first sheet layer with fastening components on at least one side of the first sheet layer, a second sheet layer with fastening components on both sides of the second sheet layer, and a third sheet layer with fastening components on at least one side of the third sheet layer, wherein the second sheet layer is positioned adjacent to and between the first sheet layer and the third sheet layer, wherein the fastening components on the one side of the first sheet layer engage with the fastening components on one side of the second sheet layer, wherein the fastening components on the one side of the third sheet layer engage with the fastening components on the other side of the second sheet layer, and wherein the engaged fastening components enhance interlayer strength.

4 Claims, 20 Drawing Sheets

(56) References Cited

U.S. PATENT DOCUMENTS

| | | | |
|---|---|---|---|
| 3,808,087 A * | 4/1974 | Milewski et al. | 428/86 |
| 4,560,603 A * | 12/1985 | Giacomel | 428/86 |
| 4,622,253 A * | 11/1986 | Levy | 428/91 |
| 4,759,812 A | 7/1988 | Miller | |
| 4,888,228 A | 12/1989 | Sidles | |
| 5,077,870 A * | 1/1992 | Melbye et al. | 24/452 |
| 5,143,569 A | 9/1992 | Gotoh et al. | |
| 5,358,767 A * | 10/1994 | Bompard et al. | 428/86 |
| 5,518,795 A * | 5/1996 | Kennedy et al. | 428/100 |
| 5,543,194 A * | 8/1996 | Rudy | 428/69 |
| 5,605,729 A * | 2/1997 | Mody et al. | 428/37 |
| 5,616,394 A * | 4/1997 | Gorman et al. | 428/99 |
| 5,662,128 A * | 9/1997 | Habibi | 132/210 |
| 5,736,222 A * | 4/1998 | Childress | 428/119 |
| 5,738,398 A * | 4/1998 | Miano | 294/166 |
| 5,879,492 A * | 3/1999 | Reis et al. | 156/72 |
| 5,891,549 A * | 4/1999 | Beretta et al. | 428/100 |
| 6,265,333 B1 * | 7/2001 | Dzenis et al. | 442/346 |
| 6,298,624 B1 * | 10/2001 | Pacione | 52/511 |
| 6,301,755 B1 | 10/2001 | Gaber | |
| 6,645,610 B1 * | 11/2003 | Reis et al. | 428/297.4 |
| 6,701,580 B1 | 3/2004 | Bandyopadhyay | |
| 6,821,368 B2 * | 11/2004 | Benson et al. | 156/92 |
| 7,018,496 B1 | 3/2006 | George et al. | |
| 7,169,250 B2 * | 1/2007 | Kim et al. | 156/290 |
| 7,981,495 B2 * | 7/2011 | Kim et al. | 428/86 |
| 8,168,027 B2 * | 5/2012 | Jacobsen et al. | 156/247 |
| 2002/0116796 A1 * | 8/2002 | Wills | 24/306 |
| 2003/0224137 A1 * | 12/2003 | Chung | 428/85 |
| 2003/0224143 A1 * | 12/2003 | Ianniello et al. | 428/137 |
| 2006/0024499 A1 * | 2/2006 | Kim et al. | 428/401 |
| 2008/0160248 A1 * | 7/2008 | Jacobsen et al. | 428/113 |
| 2008/0193709 A1 | 8/2008 | Han | |
| 2008/0274326 A1 * | 11/2008 | Kim et al. | 428/90 |
| 2010/0227112 A1 * | 9/2010 | Han | 428/92 |
| 2010/0313388 A1 * | 12/2010 | Chou | 24/445 |

OTHER PUBLICATIONS

Nanlin Han and Lin Sun, "3 Dimensional Fiber Structures for Composites", 3D Nanocomposites, Inc., 27653 Woodfield Pl, Valencia, California 91355, USA, Copyright 2006, Published by Society for the Advancement of Material and Process Engineering with permission.

* cited by examiner

Diagram of the basic units in a three-ply complex yarn: the core or base yarn, the decorative or effect yarn, and the binder or tie yarn. FIG.12 (a)

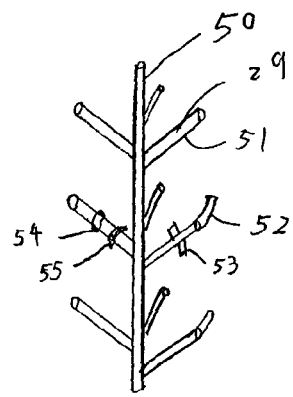
side view
FIG 16A
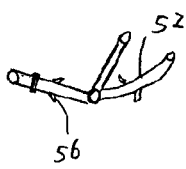
FIG 16B
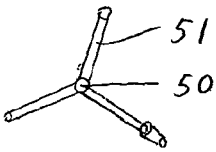
FIG 16C
top view
FIG. 16
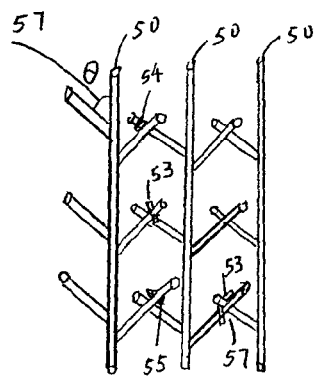
side view
FIG.17A
top view
FIG.17B
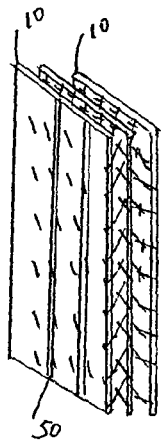
FIG.18A
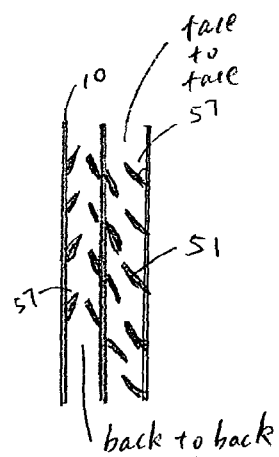
back to back
FIG 18B

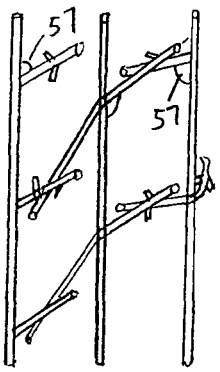
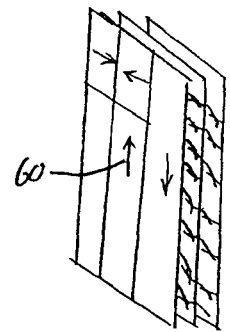
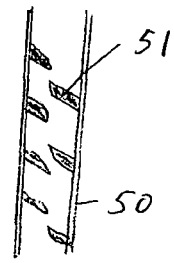
FIG.19A     FIG.20     FIG.21
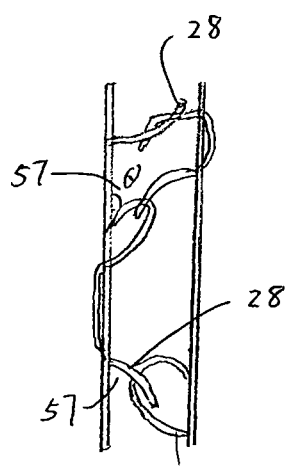
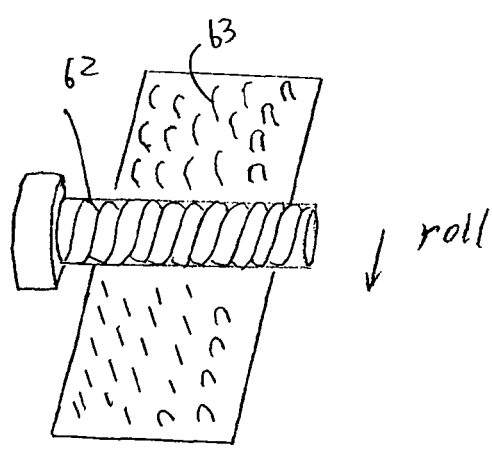
FIG.22     FIG.23

MALIMO TYPE STITCH-KNIT FABRIC

FIBER PRODUCTS, PREPREGS, COMPOSITES AND METHOD OF PRODUCING SAME

CROSS-REFERENCE TO RELATED APPLICATIONS

This application claims the benefit of U.S. Provisional Application No. 60/854,632, filed on Oct. 27, 2006.

FIELD OF THE INVENTION

The present invention relates to 3 dimension (3D) fibers, 3D fabrics, 3D preforms, 3D prepregs and 3D composites and methods to make them using textile industry technologies, hook and loop technologies, plastic industry technologies and nano-fiber technologies, with the objects to increase their mechanical strength, interlaminate strength, fatigue durability and impact resistance, and their manufacturability.

BACKGROUND OF THE INVENTION

Fiber composite materials have been used in the industry over the past three decades. However, their utilization in the primary load-bearing structures has been limited by its high sensitivity to out-of-plane failures resulting from the low interlaminar fracture toughness. Method to alleviate these problems is to improve delamination resistance in the thickness direction by stitching, 3D weaving, 3D knitting, 3D braid. Those 3D technologies need complicated machines and manufacturing processes. So layer-by-layer lay-up and filament wrapping are still major processes in composite industry.

The present invention provides methods to make 3D composites in compatible to 2D manufacturing process.

SUMMARY OF THE INVENTION

The present invention is to provide methods to make 3 dimension (3D) fibers, 3D fabrics, 3D preforms, 3D prepregs and 3D composites, by using hook and loop (VELCRO), hook and hook, zipper heads, fish hook, and/or arrow head and mushroom head fastening components, across layers, strands and yarns. One sheet of fibers has one or multiple kinds of the above said fastening components on one side and their fastening counterparts on the other side. Laying up the sheets with said fastening components on its two side as regular 2D sheets can obtain a 3D preform. The sheets can be torn apart if re-lay-up is needed. A fiber or yarn can have the said fastening components around 360 degree on its surface. Laying up the fibers and yarns with said fastening components together or intercrossing each other can get a 3D preform. In those preforms, two parts of the said fastening components can lock each other if they meet and engage. A 3D composite structure can be made by using the 3D preform in resin infusing, resin film infusing, resin protrusion or RTM. The fastening components can be arranged in pattern arrays to increase strength against specified loads.

One weaved or non-weaved sheet of fiber with the said fasteners on both sides or a yarn is first impregnated with resin. Then let the impregnated fiber sheet or the yarn dry. A piece of prepreg with the said fasteners or a yarn prepreg is then made. Finally, lay and press the prepreg sheets together to any desired thickness. The fastening component can lock each other if they meet and engage. In a curing process, the resin can melt and the fastening components can further interlock each other. So a 3D composite structure is made by the said 3D prepregs. Wrapping the yarn prepreg can get a 3D composite too.

The fastening components of hook and loop (VELCRO), hook and hook, zipper heads, fish hook, arrow head and mushroom head can be made onto the sheet fiber (weaved or non-weaved), strands and yarns by textile industry technologies, such as weaving, knitting, warp knitting, braid, stitching, and hook and loop (VELCRO) technologies, and by non-weaving technologies, such as needle penetrating, air-blowing fasteners on fibers and air- or water-jet shooting fasteners on fibers. The fastening components can be bonded on, glued on, welded on, compressed on, or grown on the fibers.

The two parts of fastening components can have acute angles to their base sheet or fibers. The acute angle can allow the two part fastening components to engage like sharp teeth to increase their locking. The fastening components can be made from all kinds of suitable materials including nano fibers, strands and filaments, nanotubes, nano forks, and nano arrows.

This 3D fiber technology can be used in rubber, building materials and plastic industries.

BRIEF DESCRIPTION OF THE FIGURES

FIG. 16 shows an exemplary stem fiber having 3 dimension branches and forks.

FIG. 17 shows an exemplary networking of 3D branches and forks.

FIG. 18 shows 3D branch, hook directions in an exemplary composite.

FIG. 19 shows exemplary vertical trans-layer and inter-layer fibers having acute angles along their long direction.

The acute angle vertical fibers can bite into each other and engage. This locking can have stronger strength against shear load and tear load.

FIG. 20 shows a view of an exemplary composite having acute hooks at different directions.

FIG. 21. shows an exemplary view of acute angle hooks and loops interlocking between fiber layers.

FIG. 22 shows an exemplary view of the engagement of hooks and hooks, hooks and loops.

FIG. 23 shows an exemplary process of using a spiral screw cylinder to make the hooks, loops and fibers in the curves of spiral spur gear.

Figure 24:
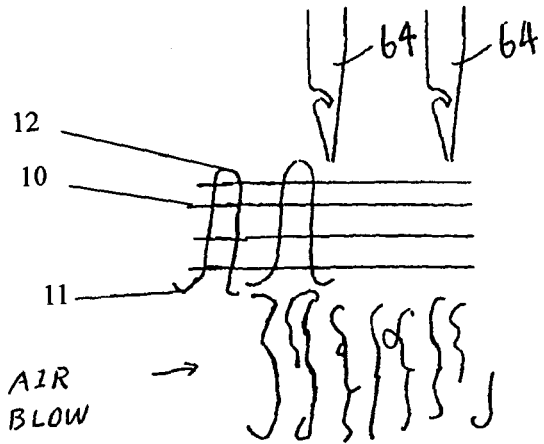

FIG. 24 shows an exemplary process of using a needle to bring hook and loop fibers trans-layer.

Figure 25:
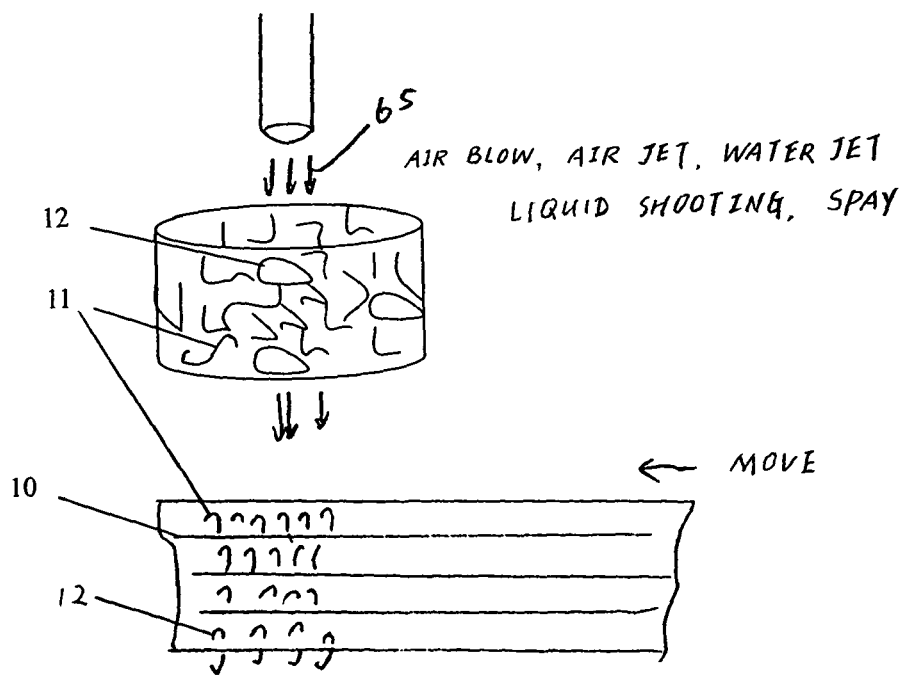

FIG. 25 shows an exemplary process of using air blow, air jet, or water jet to shoot hook and loop fibers trans-layer and stay on the layer.

Figure 26:
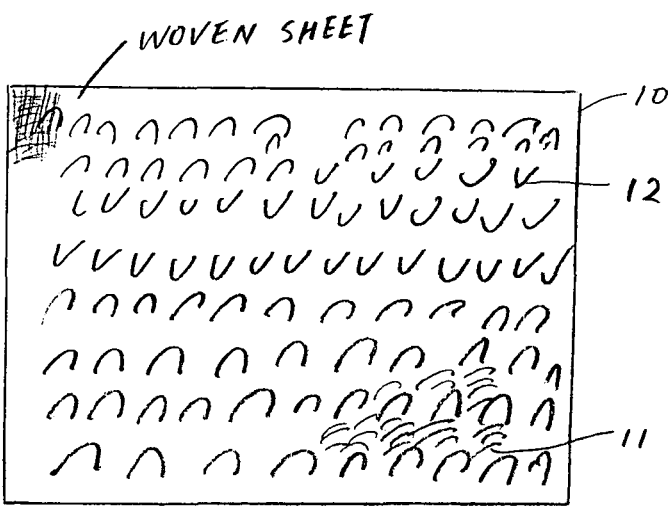

FIG. 26 shows the loop on an exemplary woven towel.

Figure 27:
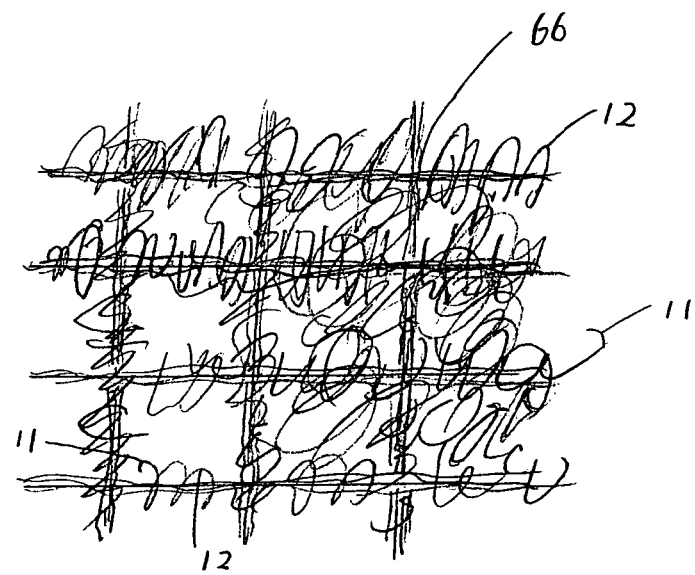

FIG. 27 shows that small loops are formed on the surface of an exemplary fabric by the use of complex yarns.

Figure 28:
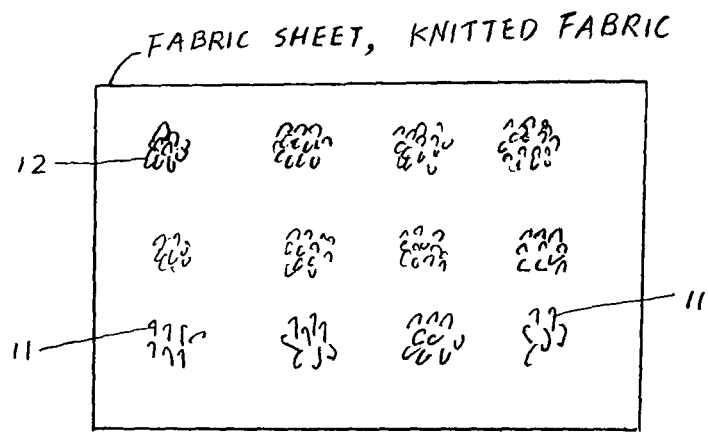

FIG. 28 shows an exemplary view of patterned knitted fabric loops.

Figure 29:
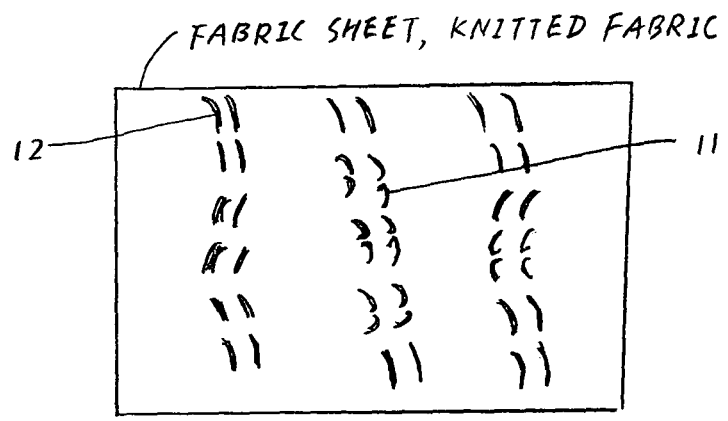

FIG. 29 shows the other side of the fabric of FIG. 28. Cutting the loops can get hooks.

Figure 30:
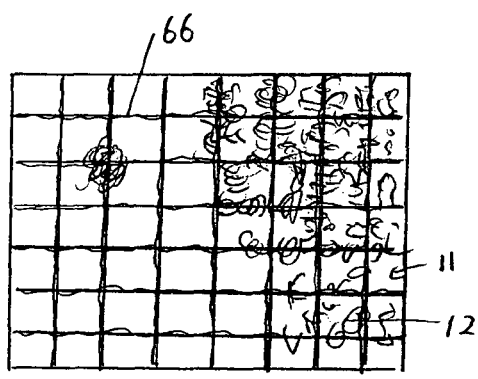

FIG. 30 shows an exemplary view of compressing the hook and loop fabric on a net.

Figure 31:
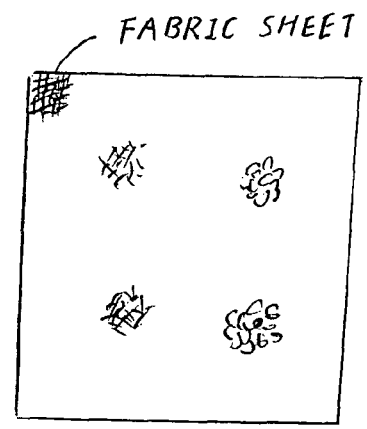

FIG. 31 shows an exemplary view of the hook and loop pattern made by embroidery.

Figure 32:
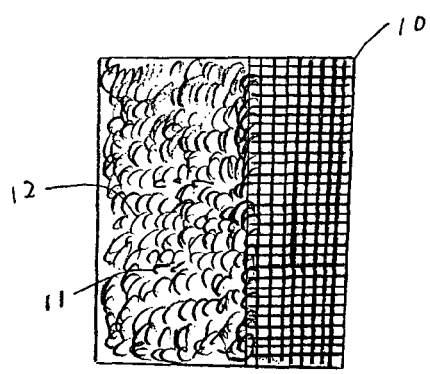

FIG. 32 shows an exemplary view of loops on a bath towel.

Figure 33:
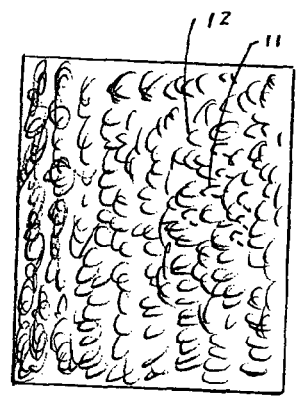

FIG. 33 shows an exemplary view of a bath towel with loops.

Figure 34:
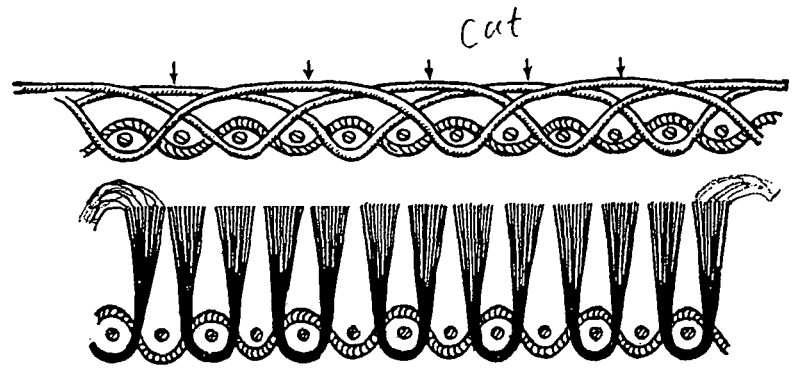

FIG. 34 shows an exemplary process of cutting the fiber to get the hooks.

Figure 35:
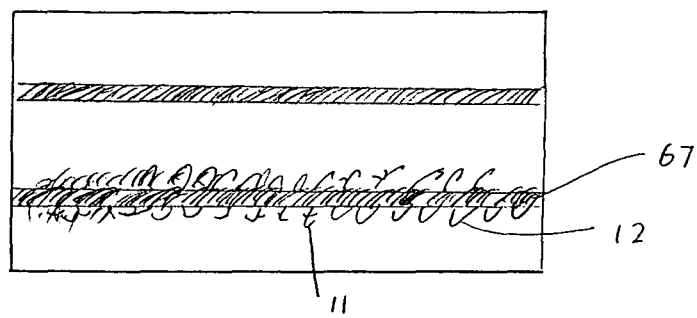

FIG. 35 shows an exemplary process of obtaining fibers and hooks by napping a yarn.

Figure 36:
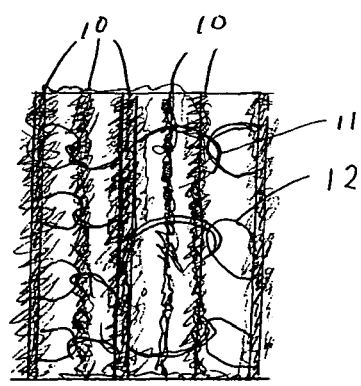

FIG. 36 shows an exemplary view of hooks and loop connecting blankets in the transverse direction.

Figure 37:
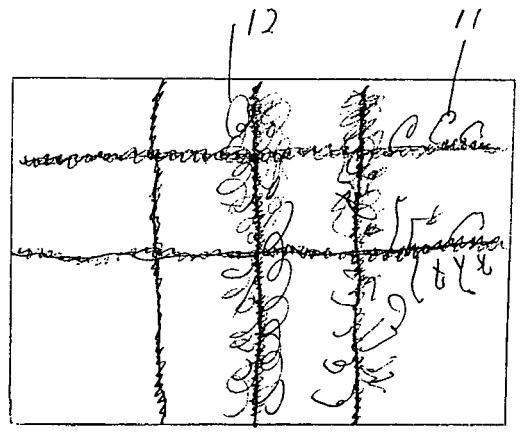

FIG. 37 shows an exemplary view of fiber strands combined with fine simple yarns.

Figure 38:
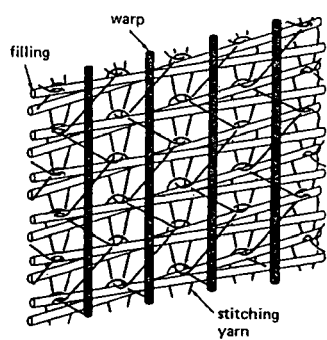

FIG. 38 shows an exemplary view of stitch and knit making the loops.

Figure 39:
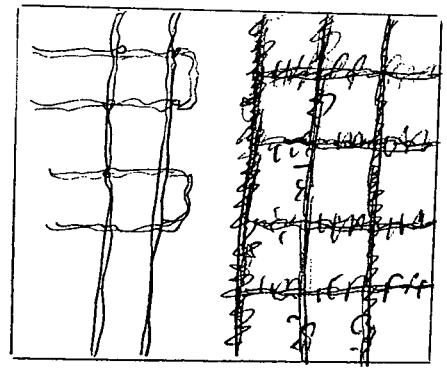

FIG. 39 shows an exemplary view of stitch and knit making the loops.

Figure 40:
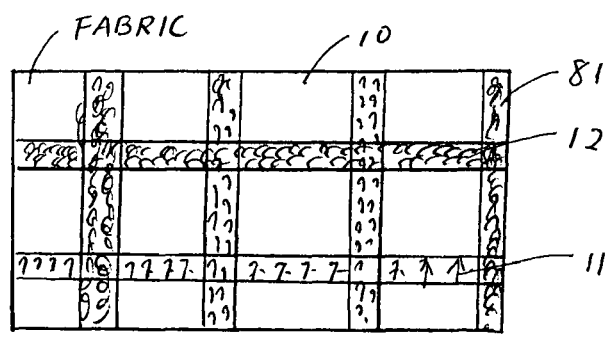

FIG. 40 shows an exemplary view of fastening components in belt areas on the sheets.

Figure 41:
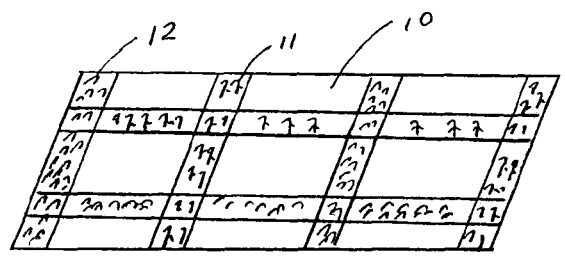

FIG. 41 shows an exemplary view of fastening components in belt areas on the sheets.

Figure 42:
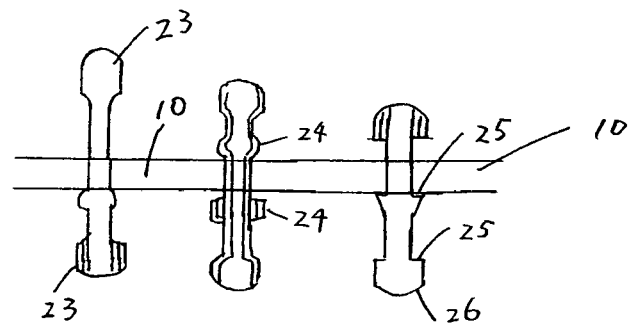

FIG. 42 shows an exemplary view of carbon nanotubes with varying diameters along length.

Figure 43:
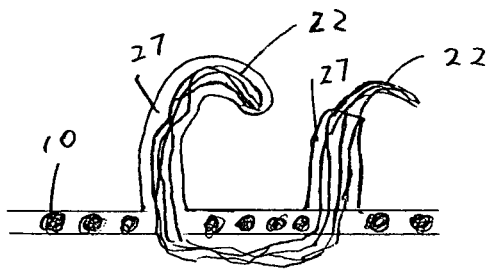

FIG. 43 shows an exemplary view of adhesive or coating materials holding a bunch of fiber hooks together.

Figure 44:
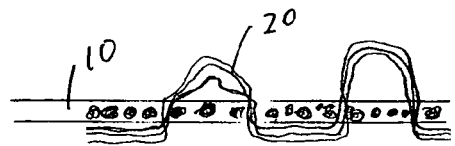

FIG. 44 shows an exemplary view of a group of fiber loops on a sheet.

Figure 45:
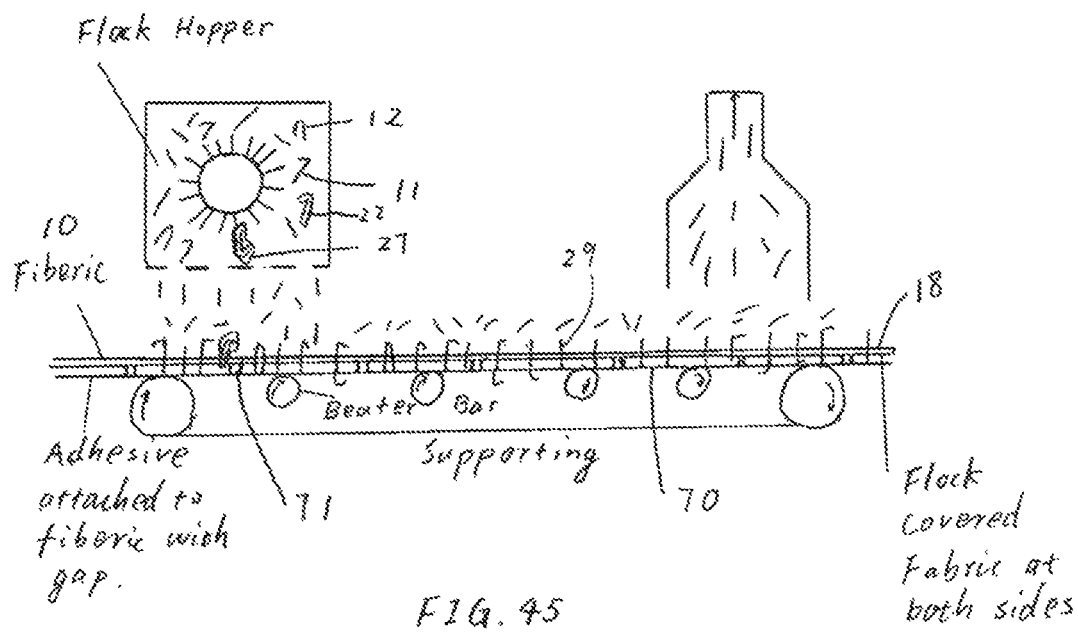

FIG. 45 shows an exemplary process of using a flocking process and a modified flocking process to prepare vertical short fibers on fiber sheet or other substance surface.

Figure 46:
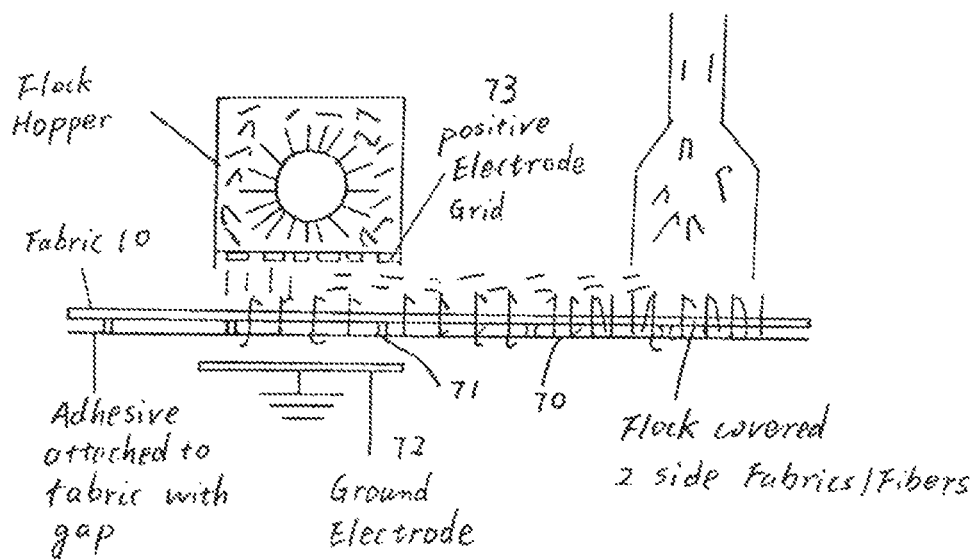

FIG. 46 shows an exemplary process of a flocking application by an electrostatic method.

Figure 47A:
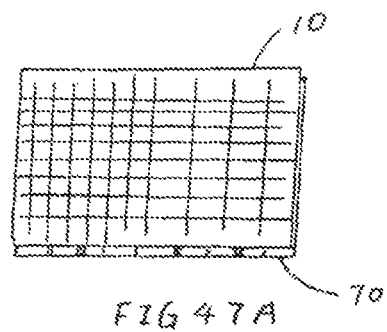

FIG. 47A shows an exemplary view of the fiber sheet net and adhesive net film with a designed pattern on them.

Figure 47B:
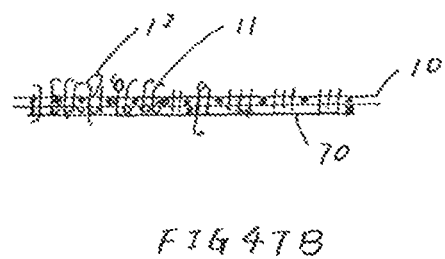

FIG. 47B shows an exemplary view of the fiber sheet net and adhesive net film with a designed pattern on them.

FIG. 48 shows an exemplary view of the adhesive net films attached to the two sides of fiber sheet.

Figure 49:
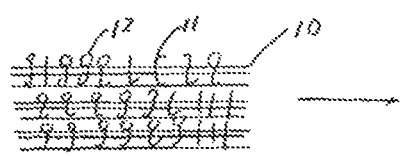

FIG. 49 shows an exemplary view of the fiber sheets with flocked vertical fibers. Loops and hooks are stacked together.

Figure 50:
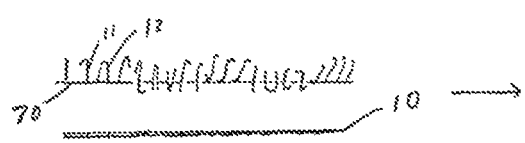

FIG. 50 shows an exemplary process of flocking fibers on adhesive film and transferring on fibers.

Figure 51:
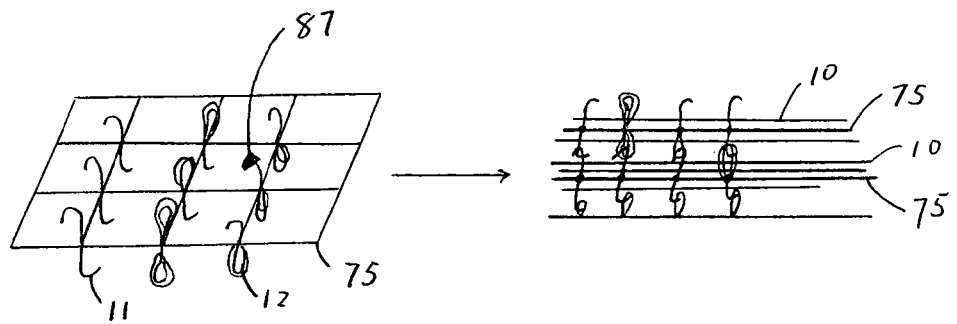

FIG. 51 shows an exemplary view of a net having hooks, loops and mushroom heads on its both sides.

Figure 52:
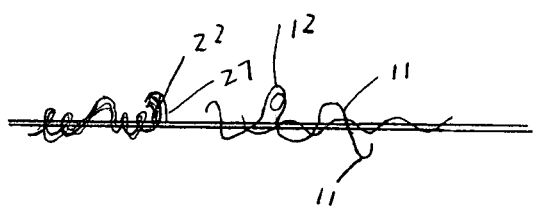

FIG. 52 shows an exemplary process of using complex yarn technology to make the yarns.

Figure 53:
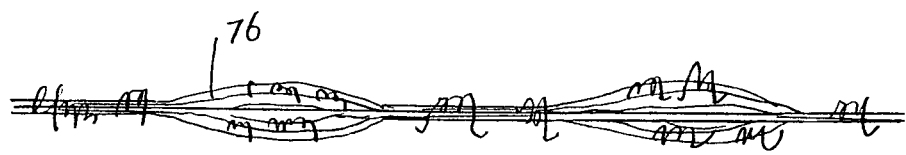

FIG. 53 shows an exemplary view of the yarn with varying width along its length.

Figure 54:
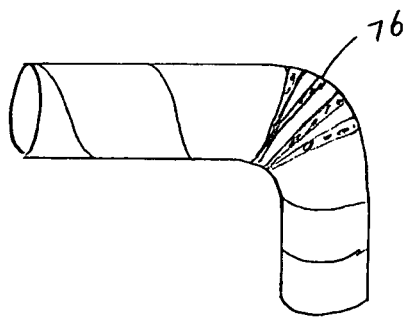

FIG. 54 shows an exemplary view of wider yarns making the tube and bottle curve area stronger.

Figure 55:
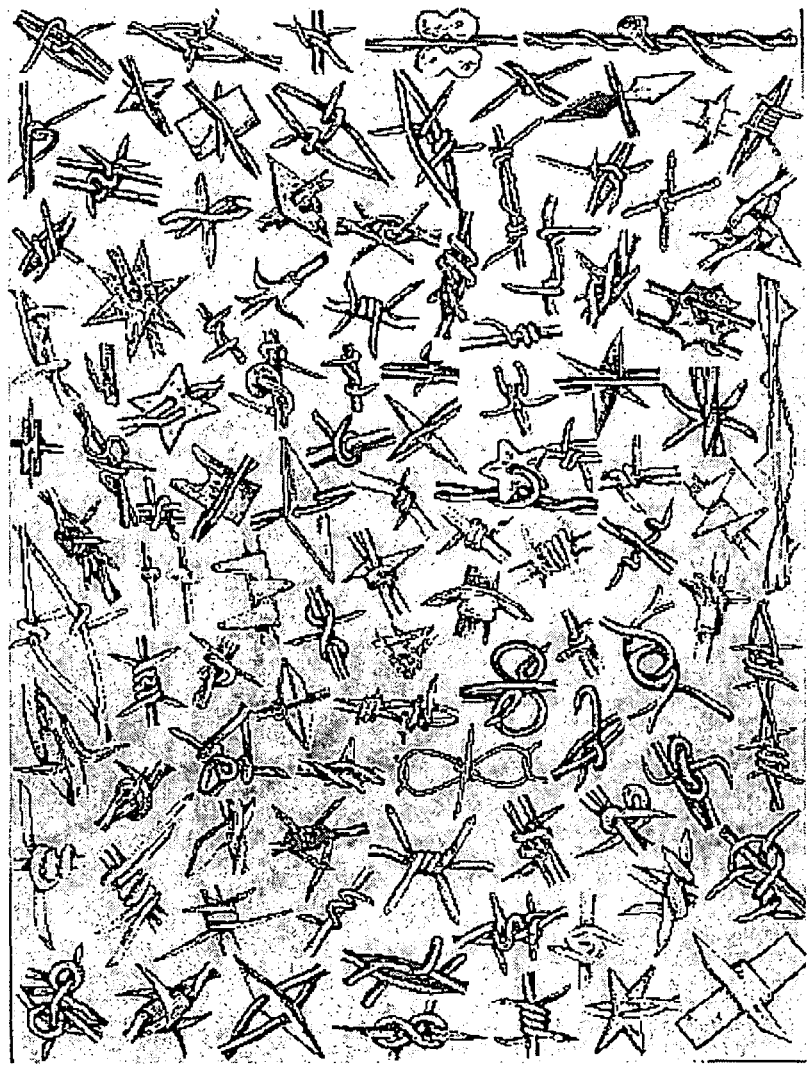

FIG. 55 shows an exemplary view of the hook, loop, mushroom head and fastening components attached on yarns just like the barb on a barbed wire.

Figure 56:
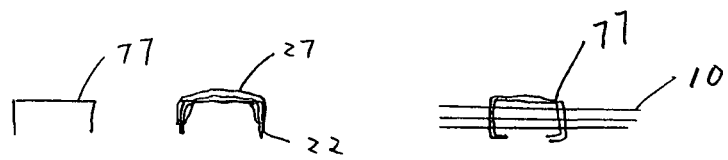

FIG. 56 shows an exemplary process of using stables to make 3D preforms and composites.

DETAILED DESCRIPTION

Figure 1:
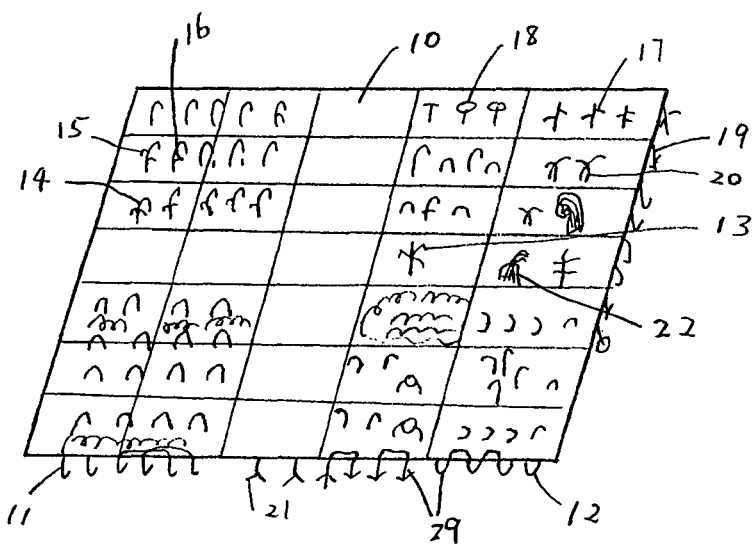
FIG. 1 shows a view of an exemplary sheet of fibers with hook, loop and other fastening components on its both sides.

Referring to FIG. 1, a sheet 10 of fibers or film has hook 11, loop 12, anchor-like hook 13, fish hook 14, fork 17 and 21, big head 18, arrow-like hook 19 and group loop 20 fastening components on both sides of the sheet. A hook can have multiple hooks 15 and 16 like a hook string. The fastening components can form a pattern or an array on the sheet with specified directions. The fastening components can be randomly scattered or mixed on the sheet.

Figure 2:
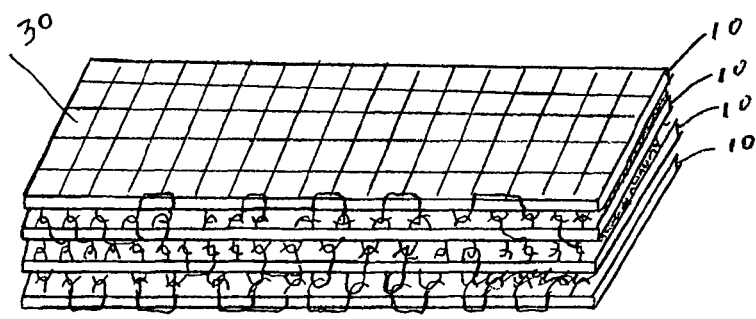
FIG. 2 shows a view of an exemplary composite made by the fiber sheets with fastening components. Several of sheets make the preform and composite. The trans-layer fastening components make a 3D composite.

As shown in FIG. 2, several sheets 10 can be laid together layer-by-layer to form a preform 30. The hook and loop, hook and hook and other fastening components can engage each other to provide trans-layer and interlayer reinforcements. The top and bottom sheet can have fastening components on only one side of the sheets.

Figure 3:
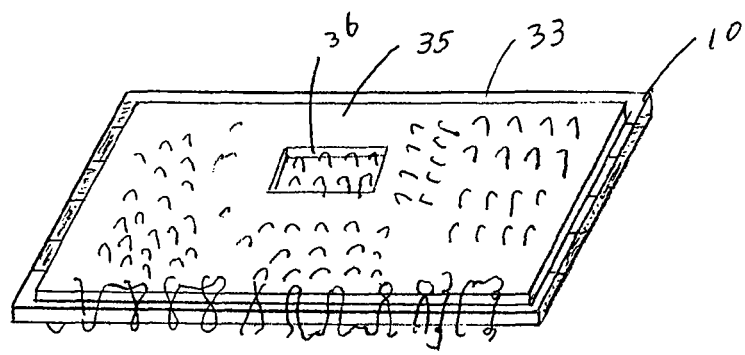
FIG. 3 shows a view of an exemplary 3D prepreg sheet with hook, loop and other fastening components on its both sides.
Figure 4:
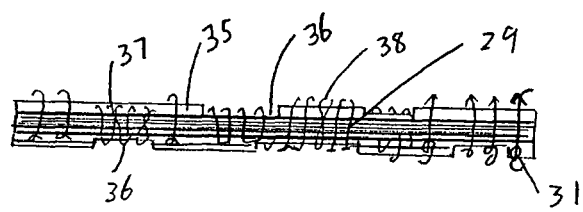
FIG. 4 shows a cross-section view of the 3D prepreg of FIG. 3.

FIG. 3 shows that resin 35 infiltrates the fiber sheet 10 to form a piece of prepreg 33. FIG. 4 shows a cross-section view of prepreg 33. The hook and loop, and fastening components 37 and 38 can be above the resin and stand out of the sheet, or can stay right under the resin surface. The fastening components can engage each other when the resin becomes liquid during curing. The resin 35 can have a low step 36 where fastening components are lower than the surrounding resin. The fastening components can be protected by the higher surrounding resin.

Figure 5:
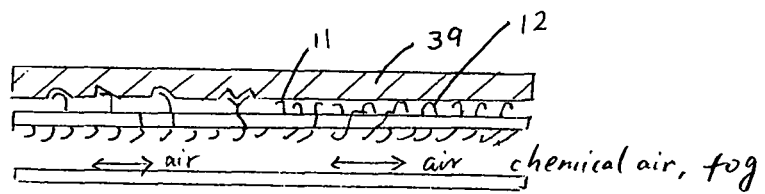
FIG. 5 illustrates an exemplary process of using mold to control the hook, loop and fastening fibers shape, direction, and angle or using chemical air to obtain the shape and angle and direction of the fastening fibers.

FIG. 5 illustrates an exemplary process of using mold and chemical air to obtain the hook, loop and fastening component shape, direction, angle and dimension.

Figure 6:
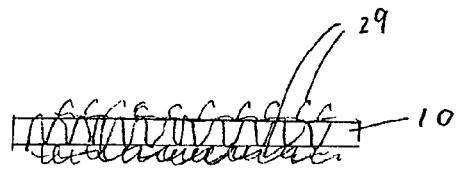
FIG. 6 shows a view of exemplary trans-layer hook and loop fibers.

FIG. 6 is a section view of trans-layer hook and loop fibers. They can be made by textile industry technologies, such as weaving, knitting, warp knitting, braid, stitching, by hook and loop (VELCRO) technologies, and by non-weaving technologies such as needle penetrating, air-blowing fasteners on fibers, and air- or water-jet shooting fasteners on fibers. The fastening components can be bonded on, glued on, welded on, compressed on, and grown on the fibers.

Figure 7:
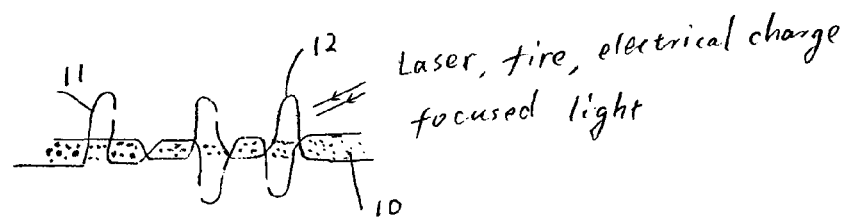
FIG. 7 illustrates an exemplary process of using laser to cut loops to get hooks.

FIG. 7 shows an exemplary process of using laser to cut the loops to get hooks. Knife also works to cut the fibers to get hooks.

Figure 8:
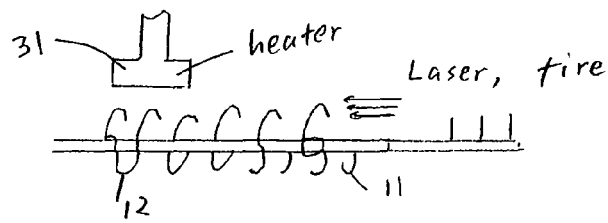
FIG. 8 illustrates an exemplary process of using laser and heat iron to make hooks.

FIG. 8 shows an exemplary process of using laser and heat iron to treat the fibers and make the hooks and loops in a specified direction and angle.

Figure 9:
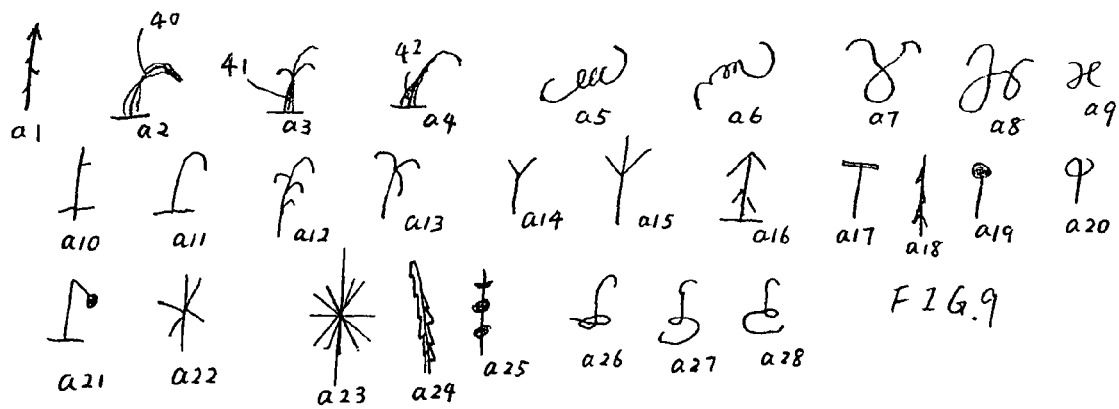
FIG. 9 shows variety of exemplary hooks. Several fibers are yarned and bonded together by glue to make the hooks stiffer.

Some embodiments of the hooks a1-a28 are illustrated in FIG. 9. Hook 40 (a2-a4) can have several fibers bonded together by adhesive 41 to make the hook much stiffer. Hook 42 can have several short fibers and several long fiber bonding together. Those hook 11, anchor-like hook 13, fish hook 14, fork 17 and 21, big head 18, arrow like hook 19 and group loop 20 fastening components are also shown in FIG. 1.

Figure 10:
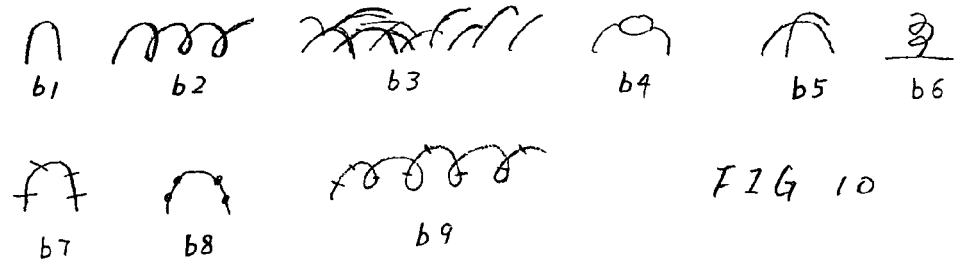
FIG. 10 shows variety of exemplary loops.

Some embodiments of the loops b1-b9 are illustrated in FIG. 10.

Figure 11:
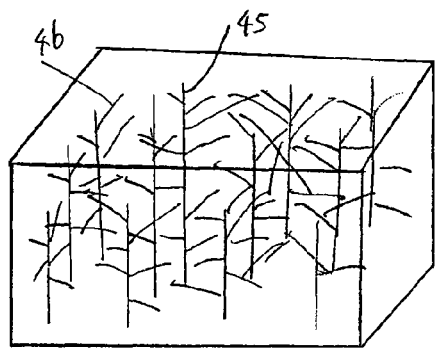
FIG. 11 shows a transparent view of an exemplary block of composite made from 3D forks and branches.

FIG. 11 shows that the rod/fiber 45 can have branches 46 coming out of itself at any direction. Fiber 45 and branch 46 can be made of different materials. The fibers 45 are aligned together and their branches 46 are cross-linked together. Therefore a 3D preform is made. The sheets can be torn apart if re-lay-up is needed. Infiltrating a 3D preform with resin can get a 3D composite.

Figure 12:
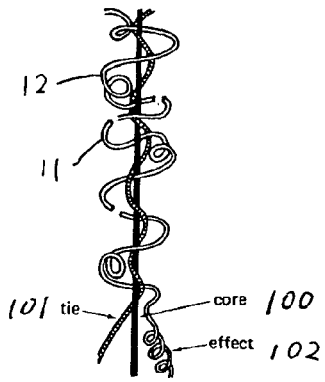
FIG. 12 shows exemplary filaments having hook and loops and other fastening components.
Figure 12:
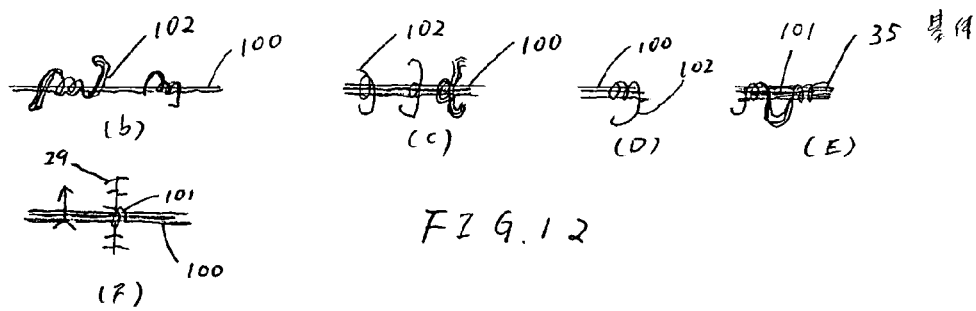

FIG. 12 shows that yarns (a)-(f) can have hooks and loops and other fastening components. They can be made by complex yarn technology, by barbed wire entanglement technology, and by air blow technology. Air blow and jet or water jet can shoot the fastening components on the yarns. The yarns are then infiltrated by resin 35 to get yarn prepregs.

Figure 13:
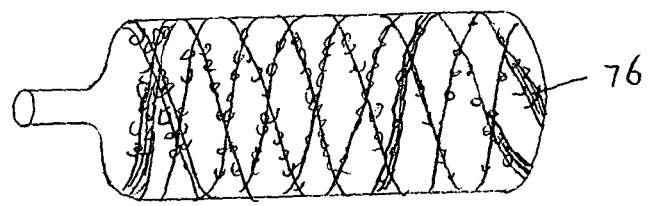
FIG. 13 shows an exemplary pressure bottle made from filaments with fastening components.

A bottle can be made by wrapping said yarns or yarn prepreg, as shown in FIG. 13. The yarn can vary its width 76 along its length. A wider yarn or belt 76 can make the curve area stronger. The fastening components can engage during wrapping. So a bottle is made with higher impact resistance 3D composite.

Figure 14:
FIG. 14 shows an exemplary vest made from the 3D composites.
Figure 15:
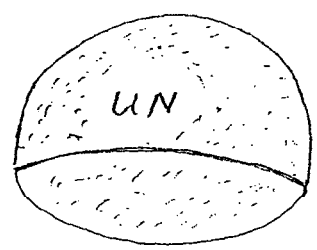
FIG. 15 shows an exemplary helmet made from 3D composites.

3D composites can be used to make vest and helmet to protect people, as shown in FIG. 14 and FIG. 15.

FIG. 16 shows that a rod, yarn, or fiber 50 can have branches 51 and forks 53 coming out from its stem and standing out to the space around the stem in 3 dimensions. Part of the branch 51 can have curve 52 acting as a hook. The part 52 can be in the same material as branch 51 or in other material bonded to branch 51. The fork 53 on branch 51 is sub-branches. The sub-branch 53, knot 54 and arrow-like tooth 55 on branch 51 or even stem 50 can act as fastening components. Tooth 55 can have a sharp face 56.

FIG. 17 shows that several fibers 50 can engage together by their branches 51 and the fastening components on their branches.

The acute angle 57 of branch to stem can help the engagement of branches to increase the engagement chance and strength. The sub-branch 53 is short enough for penetrating and long enough for acting as a hook. An acute angle 57 of the sub-branch can help the penetrating. The acute angle 58 of branch to the interlayer straight distance line 59 can also be important to the engagement.

FIG. 18 shows the fibers 50 in fiber sheets. When the fiber sheets are laid up together, the branches 51 and their fastening components can engage and interlock together to form 3D preform, prepreg and composite. The branches can have back-to-back and face-to-face engagement due to the acute angel 57 direction (branch direction), which helps to increase the strength against sheer and tear load.

FIG. 19 is a section view showing fibers' face-to-face engagement of fastening components. An acute angle fiber or branch faces another fiber or branch in acute angel.

FIG. 20 shows several fiber sheets laid up together. Some areas of the sheets can have the same direction of fastening components (branch, hook, loop), marked by arrow 60. A sheet with different direction of fastening components can make the composite have good strength against different direction load.

A face-to-face lock is illustrated in FIG. 21, just like sharp teeth bitten together. The fastening components with acute angles are important in controlling the fastening direction when the fiber sheets are compressed.

FIG. 22 shows that hooks, loops and fibers can be made in the curves of a spiral spur gear or a spiral screw cylinder. Those curves help the hooks and loops engagement.

FIG. 23 shows an exemplary process of using a spiral screw cylinder 62 to make the hooks, loops and fibers in the curves of spiral spur gear 63.

FIG. 24 shows an exemplary process of using needles 64 to bring hook and loop fibers trans-layer.

FIG. 25 shows an exemplary process of using air blow, air jet, or water jet 65 to shoot hook and loop fibers trans-layer and staying on the layer.

FIG. 26 shows the loops on a woven towel.

FIG. 27 shows small loops are formed on the surface of the fabric by the use of complex yarns.

FIG. 28 shows patterned knitted fabric loops.

FIG. 29 shows other side of the fabric of FIG. 28. Cutting the loops can get hooks.

FIG. 30 shows compressing the hook and loop fabric on a net 66.

FIG. 31 shows the hook and loop pattern made by embroidery.

FIG. 32 shows loops on a bath towel. Terry cloth, used in towels and robes, is constructed with uncut loops of yarn on both sides of the sheet cloth. These loops are formed by holding the ground wrap yarns under tight tension and leaving the wrap yarns that form the pile in a slack state. The shed is made and picks are inserted. And this is repeated for a specified number of picks, usually three, without any beating in. After the picks have been placed, they are battened into position. This causes the slack wrap yarns to be pushed into loops between the picks. While the typical terry cloth has loops on both sides, it is possible to make fabrics by this method with loops on only one side. Hook yarns are recommended to be stiff. And loop yarns are softer.

FIG. 33 shows a bath towel with loops.

FIG. 34 shows cutting the fiber to get the hooks.

FIG. 35 shows obtaining the fibers and hooks by napping a yarn 67.

FIG. 36 shows hooks 11 and loop 12 connecting blankets in the transverse direction.

FIG. 37 shows fiber strands are combined with fine simple yarns.

FIG. 38 and FIG. 39 show that stitch and knit make the loops.

FIG. 40 and FIG. 41 show the fastening components can be in belt areas on the sheets. So the two sheets can easily engage in the belt areas.

FIG. 42 illustrates that the carbon nanotubes can have big head 23 at its ends. The big heads are the end areas having bigger diameters. The big diameter tube area can be single layer tube and/or multiple tube layers. The big diameter area can be located along the tube like a chain. Two big diameter areas 24 can hold the tube on a fabric or a thread. The bigger diameter areas can have one end with sharp edge 25 acting as hook and another end with smooth cure 26 acting as a bullet head for penetrating fibers and loops.

FIG. 43 shows adhesive or coating materials 27 holding a bunch of fiber hooks 22 together to make the hook stronger and stiffer. Those stiffer hooks are easier to penetrate fiber loops and bundles to lock with them.

FIG. 44 shows a group of fiber loops 20 on a sheet 10.

FIG. 45 shows an exemplary process of using a flocking process and a modified flocking process to prepare vertical short fibers on fiber sheet 10 or other substrate surface 18. The flocking process involves applying short fibers 11, fiber bundles 22 and bonded fibers 27 directly on to a substrate that has been previously coated with an adhesive. The process uses mechanical or electrical equipment that mechanically erect or electrically charges the flock short fibers causing them to stand up. The short fibers are then propelled and anchored into the adhesive at near right and right angles to the substrate. The flocking process can be accomplished by one of the four methods: electrostatic, beater bar/gravity, spraying, and transfers. Flocking material can also be spayed using an air compressor, reservoir and spay gun similar to the one spaying paint. Flocking can also be applied by printing an adhesive on to a material, and then rapidly vibrating the substrate mechanically, while the flock fibers are dispensed over the surface.

The vibration promotes the density of fibers and causes the flocking fibers to adhere to the adhesive and pack into a layer. This process is a beater bar or gravity flocking system.

FIG. 46 shows a flocking application by the electrostatic method. The fiber sheet 10 goes between positive electrode grid 73 and ground electrode 72 to let flocking short fibers penetrate fiber sheet and adhesive film and stay on them. Adhesive standoffs 71 are provided in between the fiber sheet 10 and the adhesive net film 70 so as to create a gap between the fiber sheet 10 and the adhesive net film 70. The same arrangement is illustrated in FIG. 45.

In FIGS. 47A and 47B, the fiber sheet 10 is attached to an adhesive net film 70 underneath. The adhesive on the net film attach to the fiber sheet 10 and make a gap between the adhesive net film and fiber sheet.

Figure 48A:
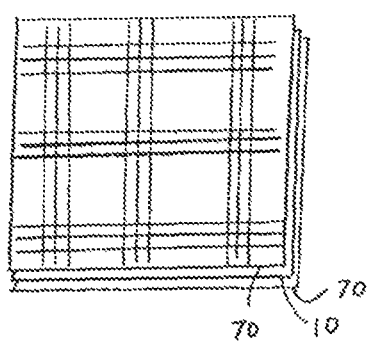
Figure 48B:
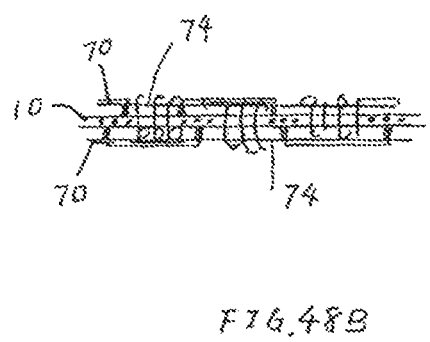

FIG. 48A and FIG. 48B show the adhesive net films 70 can be attached to the two sides of fiber sheet 10. The adhesive film 70 has window 74 to allow short flocking fibers to penetrate fiber sheet 10 and stay at desired areas.

FIG. 49 shows the fiber sheets with flocked vertical fibers, loops and hooks are stacked together. During curing process, the adhesive melt and the hooks and loops link together.

A much easier way to add flocking to materials is to apply standard flocking transfers. Basically the flocking process is virtually the same as the one for a screen printing with only a few differences. FIG. 50 shows the short fibers are flocked on adhesive film 70 and then transfer onto the fiber sheet 10.

If the short fibers are dielectric, a chemical treatment is needed to enable the fibers to accept an electrical charge. A certain amount of conductivity must be present for electrostatic flocking process to occur.

FIG. 50 shows flocking fibers on adhesive film and transferring them on fiber sheets.

FIG. 51 shows a net 75 has hooks, loops and mushroom heads on its both sides. The hooks, loops and mushroom heads can go through fiber sheet 10 to link with next net 75 when the nets 75 and fiber sheets stack together.

FIG. 52 shows using complex yarn technology to make the yarns. The hooks or mushroom heads can have multiple stands 22 and be bonded with material 27 to make them stronger and harder.

FIG. 53 shows a yarn can vary its width 76 along its length. So the wider yarn or even belt 76 makes the tube and bottle curve area stronger, as shown in FIG. 54.

The hooks, loops, mushroom head and fastening components can attach on yarns just like the barb on a barbed wire, as shown in FIG. 55.

Stables can also be used to make 3D preforms and composites, as shown in FIG. 56. Threads 22 can become a stable with adhesive 27. Using a regular stable machine and a flocking process can let the thread stables penetrate fiber sheets to make 3D preforms and composites.

What is claimed is:

1. A 3-dimension (3D) multi-layer composite, comprising:
   a first fiber sheet with a first plurality of fastening components on both surfaces of the first fiber sheet, the first plurality of fastening components penetrating through the first fiber sheet and extending outwardly from both surfaces of the first fiber sheet; and
   a second fiber sheet with a second plurality of fastening components on both surfaces of the second fiber sheet, the second plurality of fastening components penetrating through the second fiber sheet and extending outwardly from both surfaces of the second fiber sheet,
   wherein the first plurality of fastening components mechanically engage with the second plurality of fastening components,
   wherein the first and second plurality of fastening components are put on the first and second fiber sheets by flocking;
   wherein at least one of the first fiber sheet and the second fiber sheet has an adhesive net film on a top, and/or a bottom side of said at least one of the first fiber sheet and the second fiber sheet, and the fastening components of the first or second fiber sheet having the adhesive net film extend in or through the adhesive net film;
   wherein the first and second fiber sheets have sufficiently large openings for allowing penetration of the fastening components through said fiber sheets.

2. The 3D multi-layer composite in claim 1, wherein the first and second plurality of fastening components includes hooks, loops, short fibers, and fiber bundles.

3. The 3D multi-layer composite in claim 1, wherein a gap is formed between the adhesive net film and the at least one of the first fiber sheet and the second fiber sheet whereon the adhesive net forms.

4. The 3D multi-layer composite in claim 3, wherein a plurality of adhesive standoffs is provided in between the adhesive net film and the at least one of the first fiber sheet and the second fiber sheet whereon the adhesive net forms so as to form the gap.

* * * * *